Aug. 8, 1961 E. W. FERDIG 2,995,405
BALL BEARING ROLLER
Filed Dec. 6, 1957
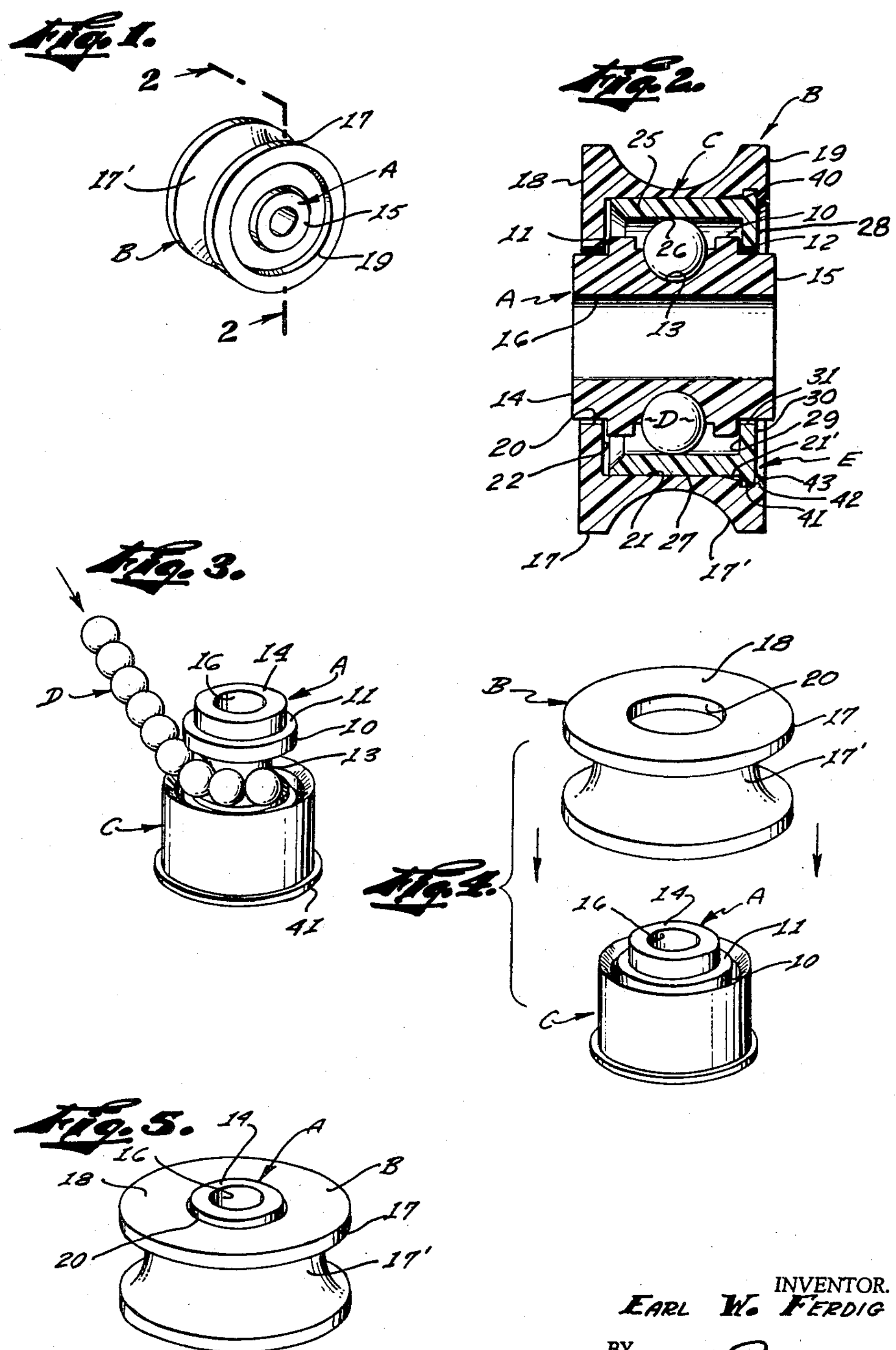
INVENTOR.
EARL W. FERDIG
BY
AGENT United States Patent Office 2,995,405

Patented Aug. 8, 1961

1

2,995,405

BALL BEARING ROLLER

Earl W. Ferdig, Burbank, Calif., assignor to George F. McMurray, Glendale, Calif.

Filed Dec. 6, 1957, Ser. No. 701,151

2 Claims. (Cl. 308—190)

The present invention has to do with a ball bearing roller construction and is more particularly concerned with an improved ball bearing roller comprising three molded plastic elements and an annular series of ball bearings.

This application is a continuation-in-part of my co-pending application Serial No. 603,739, filed August 13, 1956, now Patent No. 2,928,701, and entitled "Roller Construction."

The ordinary ball bearing roller is formed of metal or steel and includes several parts, each of which is formed by a suitable machining operation, and further includes an annular row of steel balls. The ordinary roller of the character referred to above is wanting in several ways. First, it is extremely heavy; second, it is subject to becoming rusted or oxidized; and, third, it is noisy and is subject to squeaking when it is run across a surface, especially when it becomes oxidized or rusty.

A further disadvantage of the ordinary steel or metal ball bearing roller construction arises during assembly. Due to the necessary hardness of the metal parts establishing the races for the row of balls, the elements going to make up the rollers must be machined accurately so as to fit properly together without becoming bound or misaligned and must be suitably held in assembled condition by a suitable retainer or as by deforming or staking over portions of one or more of the parts, which portion or portions must be especially provided for the purpose of maintaining the parts assembled.

An object of this invention is to provide a novel ball bearing roller construction which is light in weight, a roller which is not subject to becoming rusted or oxidized, and a roller which is quite smooth in operation.

A further object of my invention is to provide a roller construction in which each of the elements going to make up the roller, except for the ball bearings, is molded of a tough, durable and slightly resilient plastic material, such as nylon.

It is another object of the present invention to provide a roller construction of the general character referred to having but three plastic elements, one being a central hub portion, and the other two cooperating to establish an outer relatively rotatable work engaging assemblage. The central hub element of my roller construction is provided with an annular groove or race to receive the row of ball bearings. The two elements establishing the rotatable work engaging assemblages of the roller are fitted together to occur around and maintain the bearing engaged in the race in the hub, and have portions engaging the central hub section to maintain the rotatable assemblage in proper working relationship or engagement to the hub section.

It is an object of the present invention to provide a novel locking means for securing the two rotatable work engaging elements in proper assembled relationship with each other and about the central hub element.

Another object of my invention is to provide a construction of the general character referred to which is both easy and economical of manufacture and a construction which lends itself to mass production.

The various objects and features of my invention will be fully understood from the following detailed description of a typical preferred form and application of my invention, throughout which description reference is made to the accompanying drawings, in which:

2

FIG. 1 is a perspective view of the roller construction that I provide.

FIG. 2 is an enlarged transverse sectional detailed view of the construction of the present invention and taken as indicated by line 2—2 on FIG. 1.

FIG. 3 is a perspective view showing certain of the elements of my construction being assembled.

FIG. 4 is a perspective view showing a further step in the assembly of the construction that I provide.

FIG. 5 is a perspective view showing my construction fully assembled.

The ball bearing roller construction provided by the present invention and illustrated throughout the accompanying drawings, includes, generally, a central hub section A, an outer work engaging section B occurring around the hub section A, an intermediate retainer section C slidably engaged in the work engaging section B to occur around the hub section A, and an annular row of ball bearings D engaged between the hub section and the intermediate section C.

In addition to the foregoing, the construction of the present invention further includes, locking means E securing the sections B and C in fixed assembled relationship with each other and around the ball bearings D and the hub section A.

The central hub section A is a simple, elongate member having a straight, cylindrical side wall 10, flat end walls 11 and 12 and an annular, radially outwardly opening groove or ball race 13 in the side wall 10 and spaced between the ends 11 and 12. The hub section A further includes cylindrical trunnions 14 and 15, of reduced diameter, and projecting axially from the end walls 11 and 12 of the said section, and an elongate central bore 16 extending through the sections from one end thereof to the other and through the trunnions.

The outer work-engaging section B of my roller construction is an elongate, cylindrical member having an outer work-engaging surface 17, flat, radially disposed ends 18 and 19, a central bore 20, and a socket 21 of considerable diametric and longitudinal extent entering the section from the end 19 thereof and terminating at a flat bottom 22.

In the particular case illustrated, the work-engaging surface 17 of the section B is shown as having an annular recess 17' intermediate its ends, which recess is adapted to cooperatively engage a piece of work, as for instance, a rail, or the like.

The section B is adapted to receive and house the hub section A, the intermediate retainer section C and the ball bearings D in a manner that will hereinafter be described.

The intermediate retainer section C is shown as including, an elongate tubular body portion 25 having straight, cylindrical inner and outer walls 26 and 27, and an annular flange portion 28 at one end of the body portion and projecting radially inwardly therefrom and having flat, radially disposed inner and outer faces 29 and 30 and defining a central axially disposed bore 31.

The body portion 25 of the section C corresponds in outside diameter with the socket 21 in the section B and is adapted to be slidably enaged therein, as clearly illustrated in FIG. 2 of the drawings. In practice, the fit between the portion 25 and the socket is snug so that a sliding press fit is established therebetween.

In the preferred carrying out of the invention and to facilitate inserting the section C into the section B, the outer end portion 21' of the socket 21 is relieved or tapered outwardly to a slight degree and as illustrated in FIG. 2 of the drawings.

When the section C is engaged in the section B in the manner set forth above, the inner face 29 on the radially inwardly projecting flange portion 28 thereof is spaced from and opposes the flat bottom 22 of the socket 21 in the section B, and the bore 31 defined thereby is in axial alignment with the bore 20 in the section B.

With the above relationship of parts, it will be apparent that when the sections B and C are engaged with each other in the manner set forth above, the cylindrical surface 26 of the body portion 25 and the inner face 29 of the flange portion 28 of the retainer section C and the flat bottom 22 of the socket 21 in the section B cooperate to establish a radially inwardly opening channel in which the hub section A and the ball bearings D are engaged and retained.

The hub section A is arranged in the channel defined by the above-mentioned assemblage so that its ends 11 and 12 oppose the bottom 22 of the socket 21 and the inner face 29 of the flage on the retainer and is held against excessive longitudinal shifting relative to the sections B and C thereby. In practice, sufficient clearance is maintained between the ends 11 and 12 of the hub and the opposing surfaces to assure for free relative rotation between the various moving parts. The inside diameter of the body portion 25 of the retainer section C is considerably larger than the outside diameter of the hub section A and is adapted to freely receive the ball bearings D engaged in the race 13 in the hub section when the construction is assembled, as clearly illustrated in FIG. 2 of the drawings.

In practice, the inside diameter of the body portion 25 of the section C is slightly undergauged to receive the ball bearings when the construction is assembled and upon rotation of the relatively rotatable assemblages, the body of plastic establishing the body portion yields and flows a predetermined extent and establishes an outer race for the balls.

The above-mentioned yielding of the body portion of the section C, to the bearings, also serves to tighten the engagement between the said body portion of the section C in the socket in the section B.

In practice, the above noted relationship, that is, the press fit between the sections B and C and the subsequent pressure engagement of the outer assemblage about the ball members and resulting tightening of engagement between the sections B and C, is sufficient to secure the said sections together and so that they will not separate under certain working conditions and where considerable axial forces are not encountered.

The trunnions 14 and 15 projecting axially from the ends 11 and 12 of the hub section A, project freely through the bores 20 and 31 in the sections B and C and terminate at a point spaced axially from the ends 18 and 19 of the section B and serve to engage a suitable supporting means (not shown), which is provided for the roller and to maintain the rotatable sections B and C free and clear of the support means.

In practice, and when desired, a suitable axle member (not shown), can be engaged in the bore 16 of the hub section A to provide support for the roller construction.

The locking means E, securing the sections B and C in fixed assembled relationship with each other and about the hub section A, is shown as including a radially inwardly opening, annular recess 40 in the wall of the outer portion 21' of the socket in the section B and a radially outwardly projecting flange 41 on the section C, which flange is adapted to engage in said recess 40.

The recess 40 in the section B is spaced a short distance from the open end of the socket 21 and so that a relatively thin wall or lip 42, capable of limited flexing, occurs between the recess and the end 19 of the said section.

In the preferred carrying out of the invention and as illustrated in FIG. 2 of the drawings, the outer wall 43 of the lip 42 is pitched or inclined longitudinally inwardly so as to allow for passage of the flange 41 into the recess 40, but such that it cannot flex longitudinally outward and in a manner that would prevent disengagement of the flange 41 from the recess 40.

It has been found that by forming the lip 42 in the manner set forth above, the flange 41 on the member C cannot be disengaged from the channel 40 without exerting considerable force and without shearing off or otherwise mutilating the lip.

The flange 41 on the section C is preferably at the outermost end of the section and substantially corresponds in cross-sectional configuration with the recess 40.

In practice, the flange 41 on the section C can be formed to flex in the same manner as the wall or lip 42, in which case the wall 42 can remain flexible as set forth above, or it can be made rigid or unflexible. Such modification of the construction in no way effects the novelty of the present invention and has little or no effect on its operation.

In practice, and when the sections B and C are engaged with each other, the wall or lip 42 of the means E yields and flexes upon the application of sufficient pressure. Upon the flexing the flange 41 passes the lip 42 and seats in the recess 40, thereby positively locking the sections together and against separation.

In light of the foregoing, it will be apparent that the means E that I provide is such that when the flange 41 is engaged in the recess 40, the sections B and C are positively held in fixed relationship with each other. It will also be apparent that the means E is such that when it is set, it does not set up or create stresses, strains or pressures of any sort throughout the construction, which would or might cause cold flow, cracking, crazing, or other similar fatiguing and breaking down of the plastic elements and which would render the construction inoperative.

The sections A, B and C of my construction are, in the preferred carrying out of the invention, molded of light weight plastic material, such as one of the long-chain polymeric amids, commonly referred to as nylon. The ball bearings D are preferably formed of steel, however the balls, like the other elements of the construction, could be made of nylon if desired.

In assemblying the construction provided by the present invention, the hub section A is partially engaged in the retainer C and the ball bearings D are then positioned in the race 13 of the section A, as clearly illustrated in FIG. 3 of the drawings. When the ball bearings D are engaged in the race 13, the section A is fully engaged in the section C, as illustrated at the bottom of FIG. 4 of the drawings. After the sections A and B and the ball bearings D are arranged in the manner set forth above, the section B is advanced into engagement around the aforementioned assembly and in the manner indicated in FIG. 4 of the drawings and until the flange 41 of the locking means E engages in the recess 40 of the said means, whereupon a finished, assembled ball bearing roller is established, as illustrated in FIG. 5 of the drawings.

With the above sequence of assembling the structure, that I provide, it will be apparent that the construction is such that it can be easily and conveniently assembled by mechanical means and is, therefore, such that it can be advantageously mass produced and supplied to the consumer trade at an extremely low cost.

The ball bearing roller construction that I provide can be made in any desired size, however, it is primarily intended and is particularly adapted for small rollers, such as are commonly used in connection with traverse rod constructions or assemblies for draperies and the like, and where they are not subject to excessive loads.

The ideal or preferred size of my roller construction is a roller measuring approximately $\frac{9}{16}$ inches in diameter. A roller of the size set forth above, and made in accordance with present invention, will weigh approximately 1.35 grams. A conventional steel ball bearing roller construction of the same size and proportions set forth above, would weigh in excess of four grams.

From the foregoing, it will be apparent that I have provided a neat, compact, light weight ball bearing roller construction which is not subject to becoming rusted and oxidized and which is quite dependable in operation, and which involves a minimum number of parts which are easy and economical of manufacture and which require little time and expense to assemble.

Having described only a typical preferred form and application of my invention, I do not wish to be limited or restricted to the specific details herein set forth, but wish to reserve to myself any modifications or variations that may appear to those skilled in the art and fall within the scope of the following claims.

Having described my invention, I claim:

1. A ball bearing roller of the character referred to including, an elongate central hub section having a radially outwardly opening, annular ball race intermediate its ends, an annular row of ball bearings engaged in said race, an intermediate retainer section having an elongate, tubular body section occurring around the hub and engaging the balls and a radially inwardly projecting, annular flange at one end and occurring adjacent one end of the hub, an elongate outer work-engaging section having a central, longitudinal bore and a socket entering it from one end and terminating at a flat bottom, the several sections being molded of plastic material, said retainer section with said hub section and ball bearings therein being engaged in said socket with the other end of the hub section opposing the bottom of the socket, said ball bearings engaging the coupling section urging the said coupling section into tight pressure engagement with the outer section and causing the plastic material to flow and establish an outer race in which the balls are free to roll, and locking means securing the work-engaging section and the retainer section in fixed relationship with each other and about the hub section and the ball bearings, said locking means including a radially inwardly disposed annular recess in the wall of the counterbore and a radially outwardly projecting resilient flange on the retainer section and engageable in the recess.

2. A ball bearing roller of the character referred to including, an elongate, central hub section having a radially outwardly opening, annular ball race intermediate its ends, an annular row of ball bearings engaged in said race, an intermediate retainer section having an elongate, tubular body section occurring around the hub and engaging the balls and a radially inwardly projecting, annular flange at one end and occurring adjacent one end of the hub, an elongate outer work-engaging section having a central, longitudinal bore and a socket entering it from one end and terminating at a flat bottom, the several sections being molded of plastic material, said retainer section with said hub section and ball bearings therein engaged in said socket with the other end of the hub section opposing the bottom of the socket, said ball bearings engaging the coupling section urging the said coupling section into tight pressure engagement with the outer section and causing the plastic material to flow and establish an outer race in which the balls are free to roll, and locking means securing the work-engaging section and the retainer section in fixed relationship with each other and about the hub section and the ball bearings, said locking means including a radially inwardly opening, annular recess in the wall of the counterbore spaced from the open end thereof and defining a thin wall between the recess and the said end of the work-engaging section, and a radially outwardly projecting flexible flange on the retainer section and engageable in the recess, said thin wall having a longitudinally inwardly inclined outer face and being flexible and adapted to facilitate entry of the flange therein and adapted to yield upon the application of pressure to allow for passage of the flange into the recess.

References Cited in the file of this patent

UNITED STATES PATENTS

| | | |
|---|---|---|
| 2,757,054 | Van De Warker | July 31, 1956 |
| 2,760,378 | Van Deventer | Aug. 28, 1956 |
| 2,805,107 | Van De Warker et al. | Sept. 3, 1957 |

FOREIGN PATENTS

| | | |
|---|---|---|
| 502,846 | Germany | July 21, 1930 |